US005429471A

United States Patent [19]

Roccabella

[11] Patent Number: 5,429,471
[45] Date of Patent: Jul. 4, 1995

[54] APPARATUS AND METHOD FOR LOADING AUTOMATIC MACHINES WITH OBJECTS PACKED IN ALTERNATING ORIENTATIONS

[75] Inventor: Roberto Roccabella, Mozzate, Italy

[73] Assignee: Ecofina S.r.l., Milan, Italy

[21] Appl. No.: 195,456

[22] Filed: Feb. 14, 1994

[30] Foreign Application Priority Data

Feb. 11, 1993 [IT] Italy .................. MI93A0241

[51] Int. Cl.⁶ ........................................... B65G 67/02
[52] U.S. Cl. ................................... 414/395; 414/403; 198/399
[58] Field of Search ............... 414/405, 403, 395, 786; 198/399, 317, 312

[56] References Cited

U.S. PATENT DOCUMENTS

| | | | |
|---|---|---|---|
| 2,631,715 | 3/1953 | Vickers | 198/312 X |
| 3,456,825 | 7/1969 | Lacoe, Jr. | 414/403 |
| 3,487,959 | 1/1970 | Pearne et al. | |
| 3,499,560 | 3/1970 | Le Gros | 414/403 |
| 3,581,874 | 6/1971 | Keith | 198/317 |
| 3,655,080 | 4/1972 | Gianese | 414/403 X |
| 3,717,263 | 2/1973 | McWilliams | 198/317 X |
| 3,741,413 | 6/1973 | Friel | 414/395 |
| 4,813,526 | 3/1989 | Bélanger | 198/317 X |

FOREIGN PATENT DOCUMENTS

| | | |
|---|---|---|
| 0354873 | 2/1990 | European Pat. Off. |
| 1488294 | 7/1967 | France |

Primary Examiner—D. Glenn Dayoan
Attorney, Agent, or Firm—Young & Thompson

[57] ABSTRACT

An apparatus for loading objects packed in alternating orientations, for loading into automatic machines for the purposes of subsequent processing where the objects must be presented one by one with the same orientation is made up of two angle plates, a magazine carriage, a thruster, an elevator, a translationally moveable extractor unit, a track for removing the extracted objects, parallel guides along the final stretch of the track, separated from each other by a distance equal to the least thickness of the extracted objects, two other removing tracks downstream of the parallel guides, one track leading to the automatic machine to which the objects are to be fed, and the other leading to advice for inverting the objects.

10 Claims, 10 Drawing Sheets

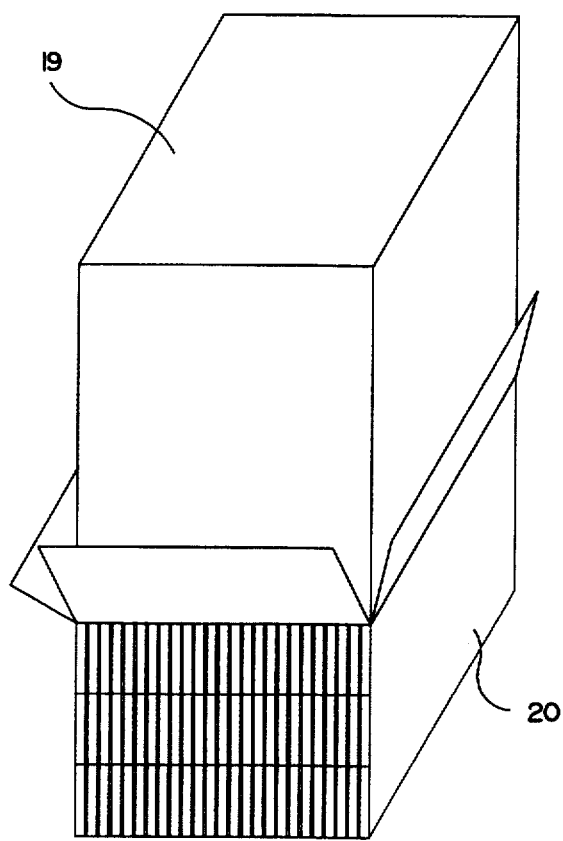 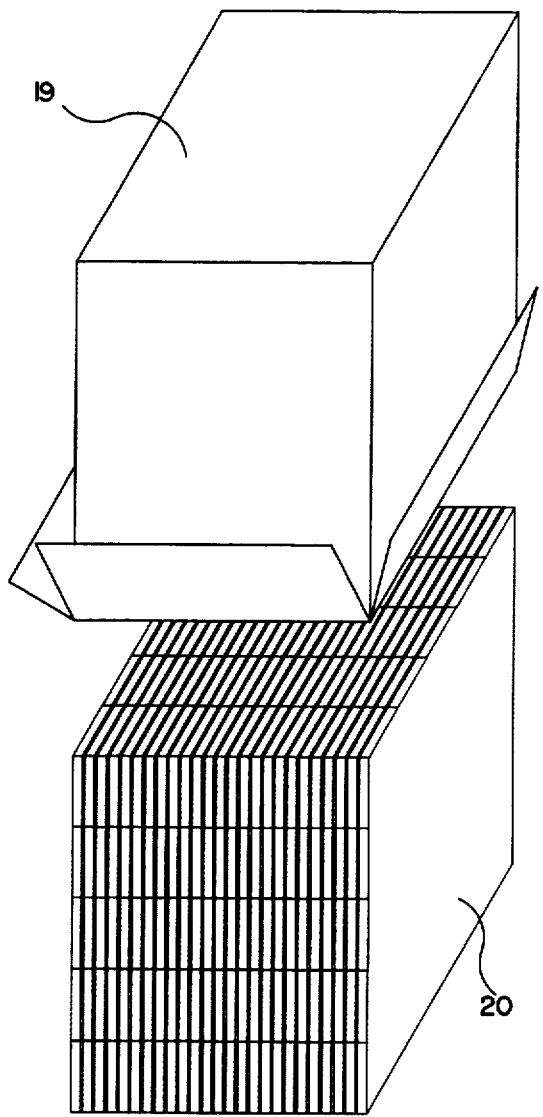
FIG. 3b
FIG. 3c

APPARATUS AND METHOD FOR LOADING AUTOMATIC MACHINES WITH OBJECTS PACKED IN ALTERNATING ORIENTATIONS

BACKGROUND OF THE INVENTION

The present invention relates to an apparatus and to a method for loading automatic machines with objects packed in bulk in alternating orientations for the purposes of subsequent processing where, however, the objects must be presented one by one with the same orientation.

Generally speaking, objects are packed together in alternating orientations in situations where, if they were all orientated the same way, they would not stack easily and would occupy too much space inside a pack, making it necessary for large boxes to be used and so wasting space and money.

A typical example of such objects is cassettes for holding recording tape, also known as musicassettes. These have one long side with a thickness of approximately 9 mm and the opposite side with a thickness of approximately 12 mm. For this reason they are packed in alternating orientations in layers, or planes, each consisting of a certain number of rows. In order to make it possible for the recording tape to be inserted in the cassettes, or labels to be struck thereto, it is necessary to extract these cassettes from the pack, arrange them in single file, and send them, all oriented in the same direction, to the automatic machine for insertion of the tape.

SUMMARY OF THE INVENTION

The object of the present invention is to provide a simple and economical solution to this problem. Its in automatic machines for the purposes of subsequent processing where said objects must be presented one by one with the same orientation, the apparatus being characterized in that it comprises: a false box formed by freely associating two angle plates, which box can be inserted into the packing boxes; a mobile magazine carriage fitted with retaining members for accommodating and holding said false box; a slide moving parallel to and located above the magazine carriage, with thrust means mounted on it at one side of the magazine carriage, the thrust means moving in the same direction; on the opposite side of the magazine carriage an elevator whose base is equal to the base of one column of said objects; an extractor unit able to move translationally perpendicularly to the direction of movement of the magazine carriage, of the thrust means and of the slide; a track on which the extracted objects are removed from the extractor unit; a pair of parallel guides along the final stretch of said track, separated from each other by a distance corresponding to the least thickness of the extracted objects and running above said removing track; and two other removing tracks leading away from the first track, immediately downstream of said parallel guides, one track leading to the automatic machine to which the objects are to be fed and the other leading to means for inverting said objects.

The invention relates furthermore to a method that can be carried out using the apparatus described above for loading objects packed in bulk into automatic machines.

BRIEF DESCRIPTION OF THE DRAWINGS

The present invention will now be described, purely by way of example, in a currently preferred embodiment thereof, with reference to the accompanying drawings in which:

FIGS. 3a, 3b and 3c diagrammatically show the stages of extracting the musicassettes shown in FIG. 2b from the packing box;

DESCRIPTION OF THE PREFERRED EMBODIMENT

Figure 1:
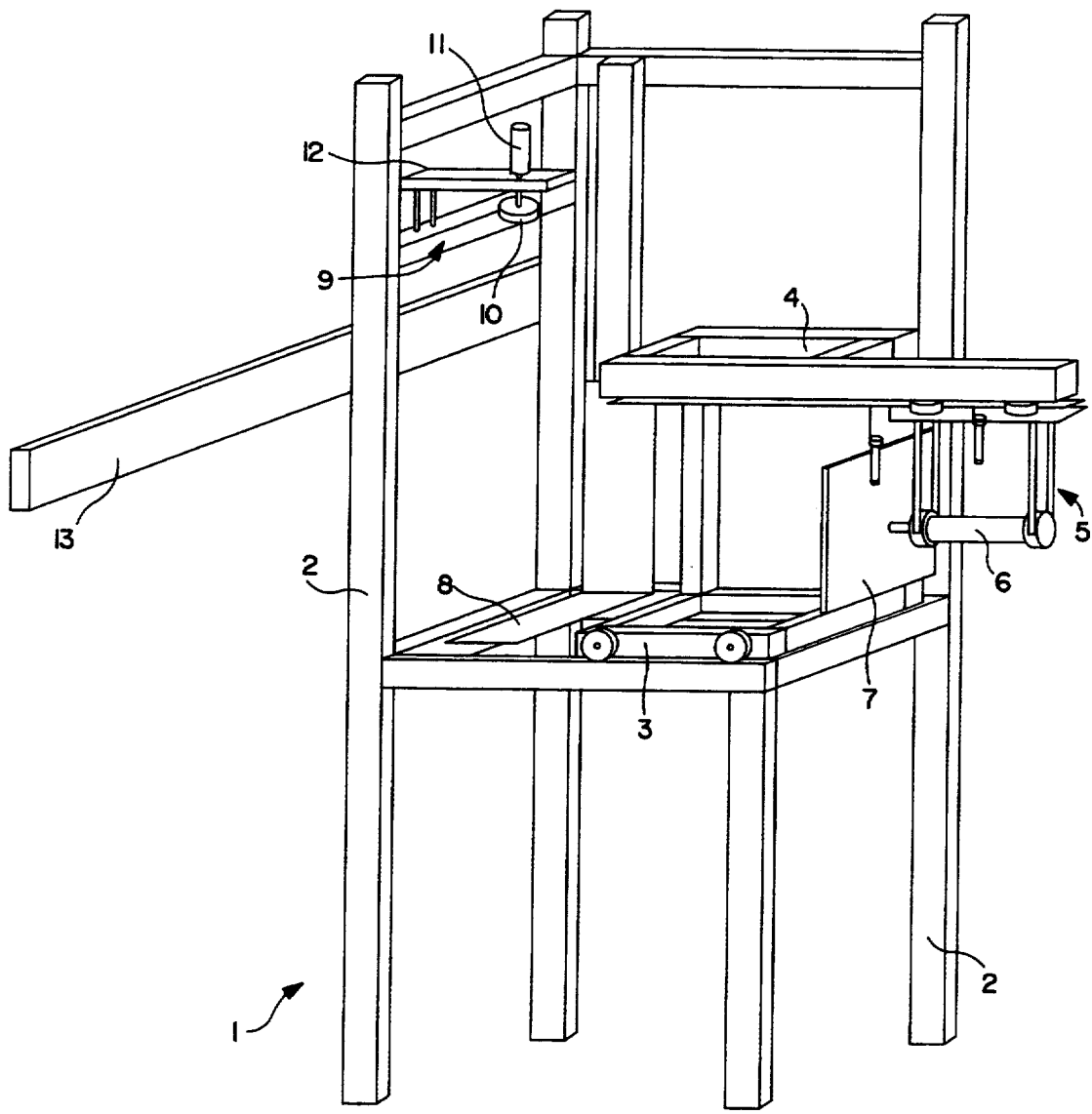
FIG. 1 is a general view of the apparatus of the present invention.

The apparatus 1 for loading the objects consists of a frame 2, supported by which are a magazine carriage 3, a slide 4 carrying thrust means 5 comprising a cylinder 6 and a plate 7 perpendicular to the carriage 3 and cylinder 6, an elevator 8, an extractor 9 consisting of a wheel 10, at least the circumference of which is of a material having a high coefficient of friction, such as rubber, this wheel being rotated by a motor 11, and of a translational drive 12, and an inclined track 13 for the removal of the objects once these have been separated. At the end of the track 13 is a track 14 with a steeper slope leading to a similar second track 15 underneath the track 13, and a pair of guides 16 which run parallel above the final stretch of the track 13 and above another track 17 at the end. In the example described the objects are musicassettes 18, 18', generally packed in boxes 19. The apparatus 1 according to the present invention is completed by a false box 20 forming a U in cross-section and formed by associating together two angle plates 20a, 20b of a rigid material such as sheet metal or a synthetic plastics material.

Figure 2A:
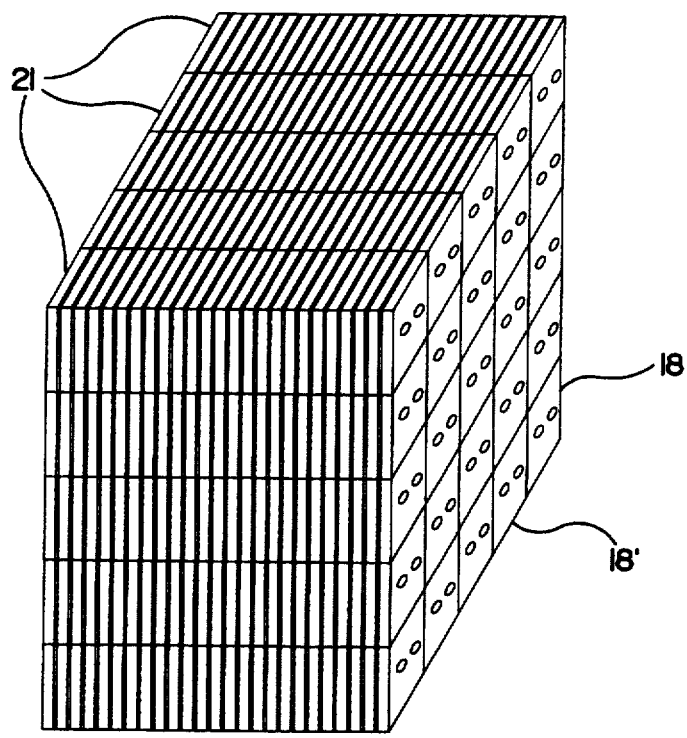
FIGS. 2a and 2b are perspective views of packed objects (musicassettes in the present example) ready for processing, seen without the packing box in FIG. 2a and inside the packing box in FIG. 2b.
Figure 2B:
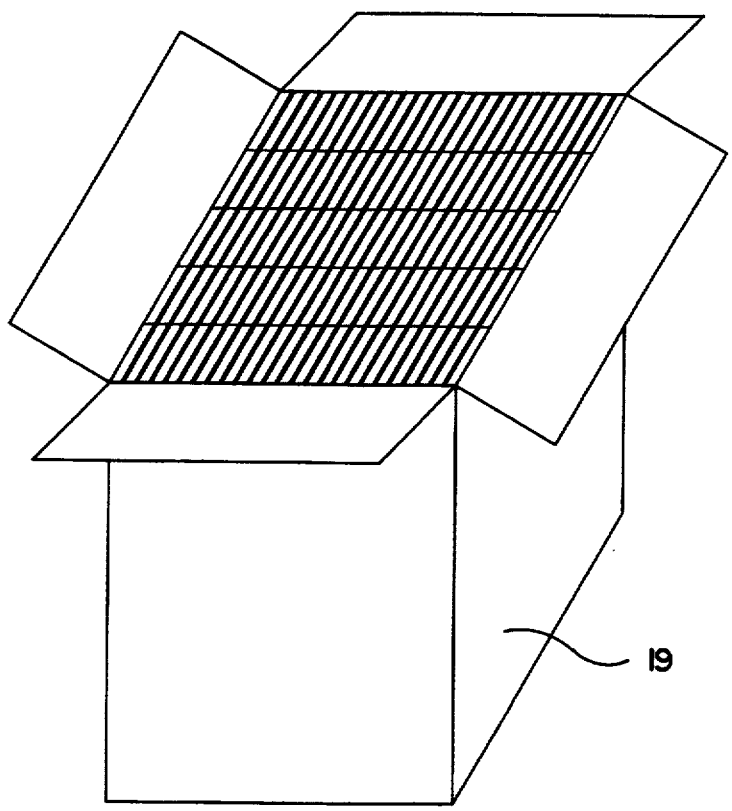

The musicassettes 18, 18' are generally packed in alternating orientations (FIG. 2a) forming columns 21 inside the box 19. The musicassettes must be loaded into the automatic machine for insertion of the tapes one by one and all with the same orientation. This job is done automatically by the apparatus according to the invention, which thus constitutes an important advance on the prior art.

Figure 3A:
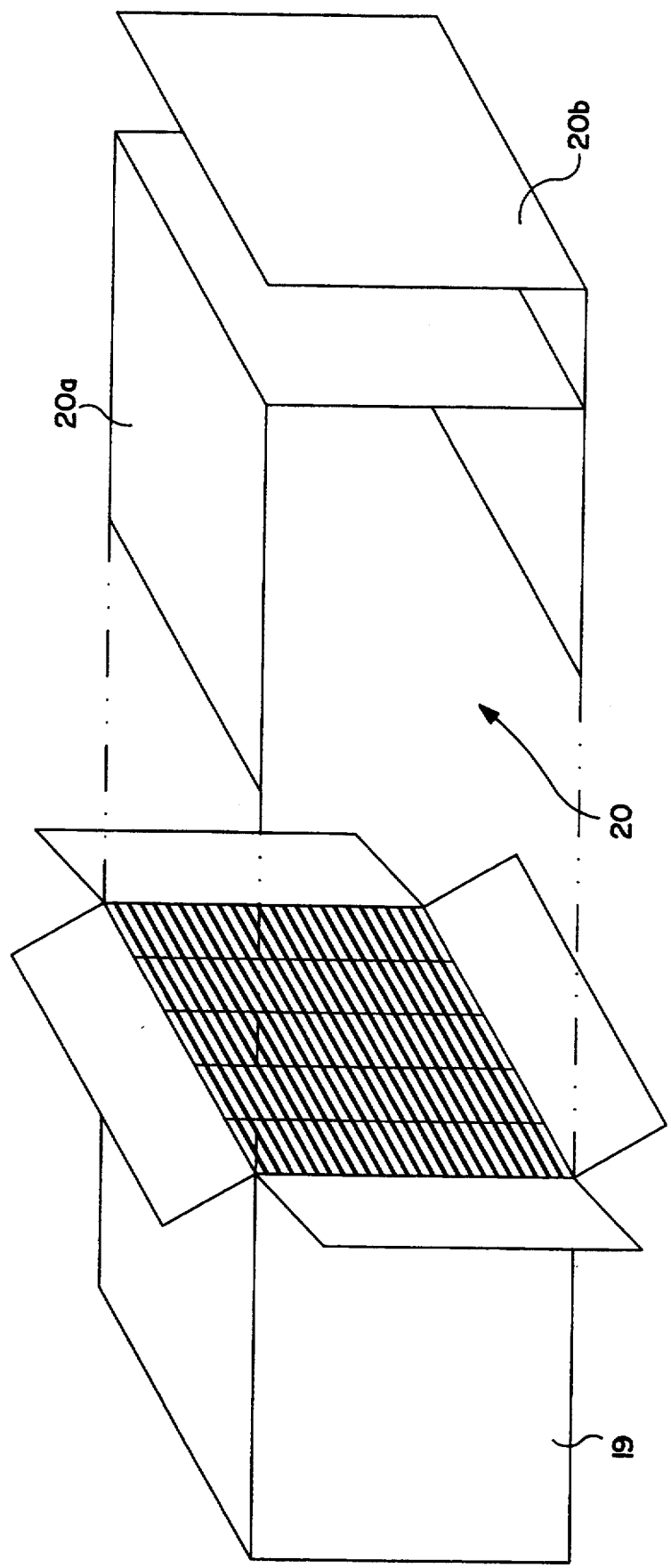

The box 19 is opened and rotated 90° relative to the work surface (FIG. 3a). The angle plates 20a and 20b are arranged with one face superimposed (FIG. 3a), in such a way as to form the false box 20 of U cross-section. The lateral faces of the false box 20 are very slightly smaller in area than the faces of the box, and the height of the base face is slightly less (for example 2 mm) than the height of the open face of the box 19: thus the false box 20 can be easily fitted inside the box 19. Once the false box 20 has been fitted inside the box 19, the box 19 can be tipped up through a further 90° (FIG. 3b) and withdrawn (FIG. 3c). By this means the musicassettes 18, 18' remain inside the false box 20 in the identical arrangement shown in FIG. 2a. The musicassettes 18, 18' are divided in this arrangement into five columns 21 each consisting of five layers of twenty-five musicassettes 18, 18'.

Figure 4:
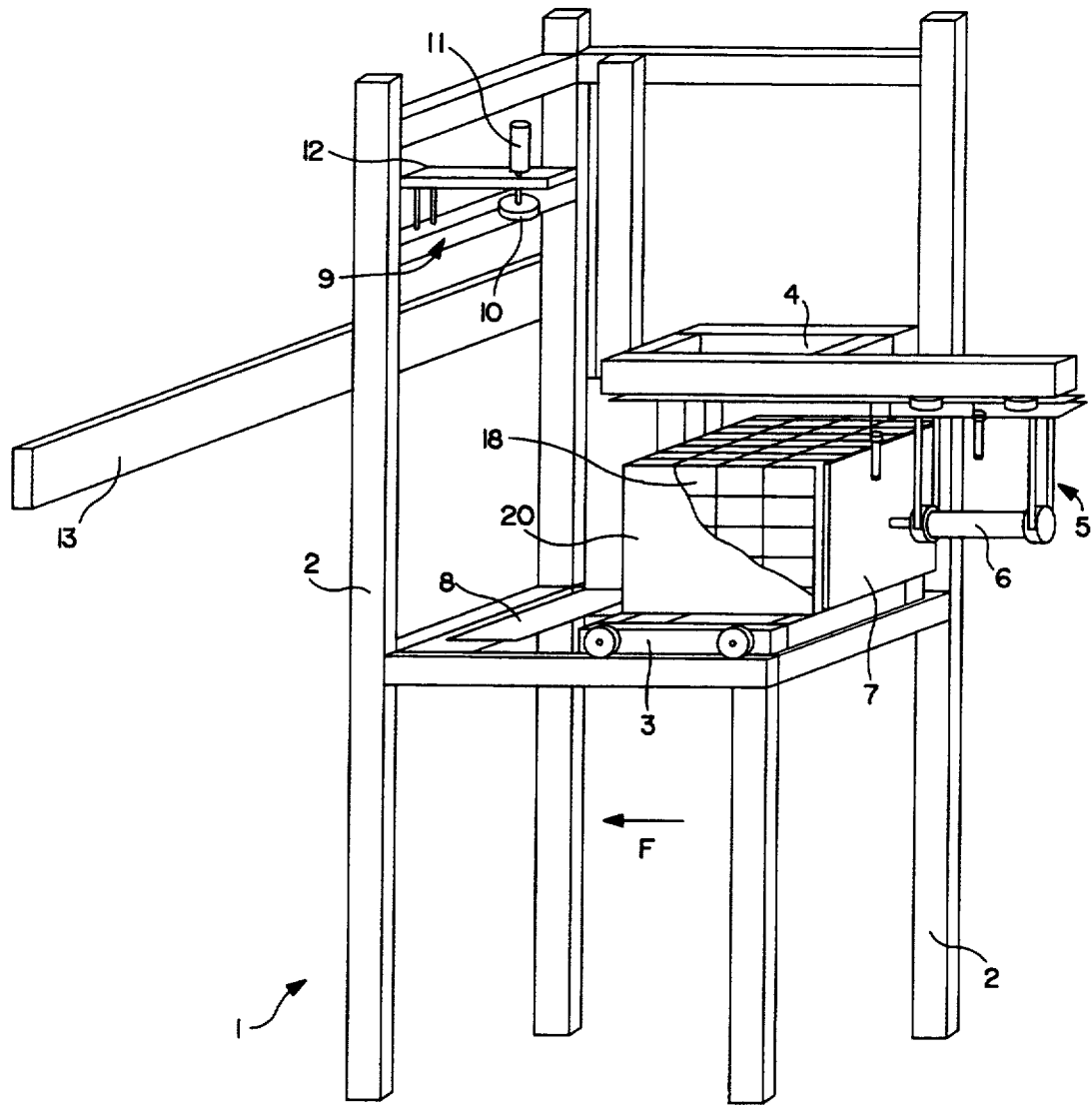
FIG. 4 is a perspective view with certain parts removed of the apparatus of the present invention upon which the musicassettes have been placed for processing.

The pack of musicassettes 18, 18' contained by the false box 20 is now placed on the magazine carriage 3 with the open sides of the false box 20 facing the thrust means 5 and the elevator 8. The plate 7 of the thrust means 5 has approximately the same dimensions as the free side of the pack of musicassettes 18, 18' and is brought up against it. At this point, both the magazine carriage 3 and the slide 4 move in the direction of arrow F (FIG. 4), to begin the operation of the thrust means 5. The piston of the cylinder 6 now pushes the plate 7 in the direction of arrow F so that the musicassettes 18, 18' advance together. The false box 20, however, is held in its place by suitable retaining members (not shown in the figures). In this way the first of the columns 21 of musicassettes 18, 18' is pushed out of the false box 20 and onto the elevator 8. Once this column is entirely supported by said elevator 8, the thrust means 5 stop and the cylinder 6 and magazine carriage 3 are simultaneously withdrawn so that the first column 21 is separated from the rest of the pack of cassettes remaining inside the false box 20. The column 21, now loaded on the elevator 8, is raised by it until the first row of musicassettes 18, 18' comes level with the wheel 10 of the extractor 9. The elevator 8 now stops and the extractor 9 is activated. This acts by rapidly spinning the wheel 10 by the action of the motor 11 and by activating the translation drive 12, which by moving in the direction of arrow F' brings the spinning wheel 10 into contact with the first of the musicassettes 18, 18'. The high coefficient of friction of the circumference of the wheel 10 helps it to grip the musicassette, whip it off the column 21 and immediately pass it onto the track 13. The track 13 may take the form of a conveyor belt, or an inclined plane or any other means capable of immediately removing the musicassettes 18, 18' in due order as they come off the column 21. The spinning of the wheel 10 means that the musicassettes 18, 18' arrive on the track 13 one behind the other, after following a curvilinear path in the direction of arrow C (FIG. 9), and in rapid succession owing to the advancing of the extractor 9 in the director of arrow F' (FIG. 8) until it has completed that row.

Figure 5:
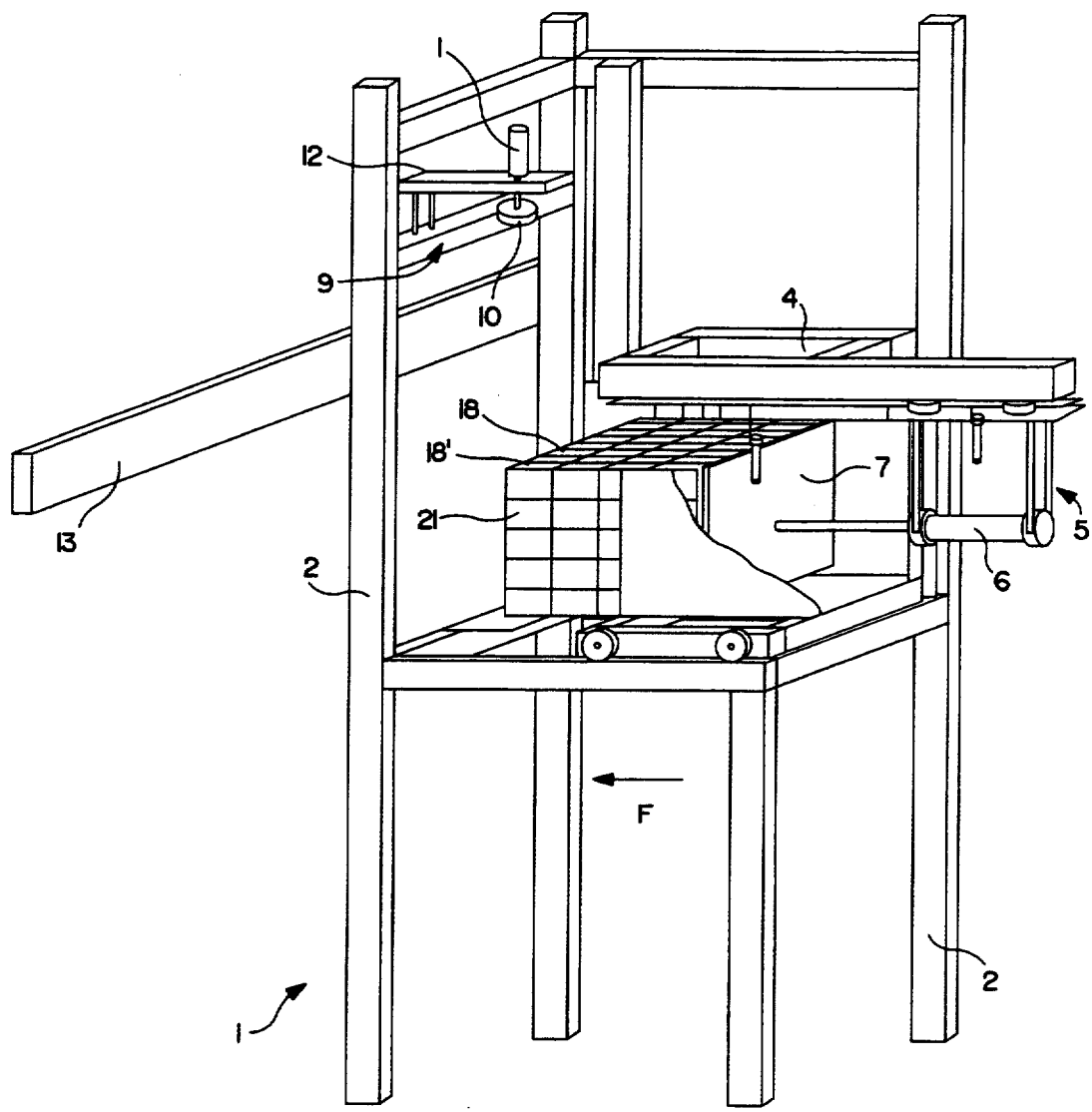
FIGS. 5 and 6 are perspective views similar to FIG. 4 of the apparatus of the present invention during the stages of taking one column of musicassettes for processing.
Figure 6:
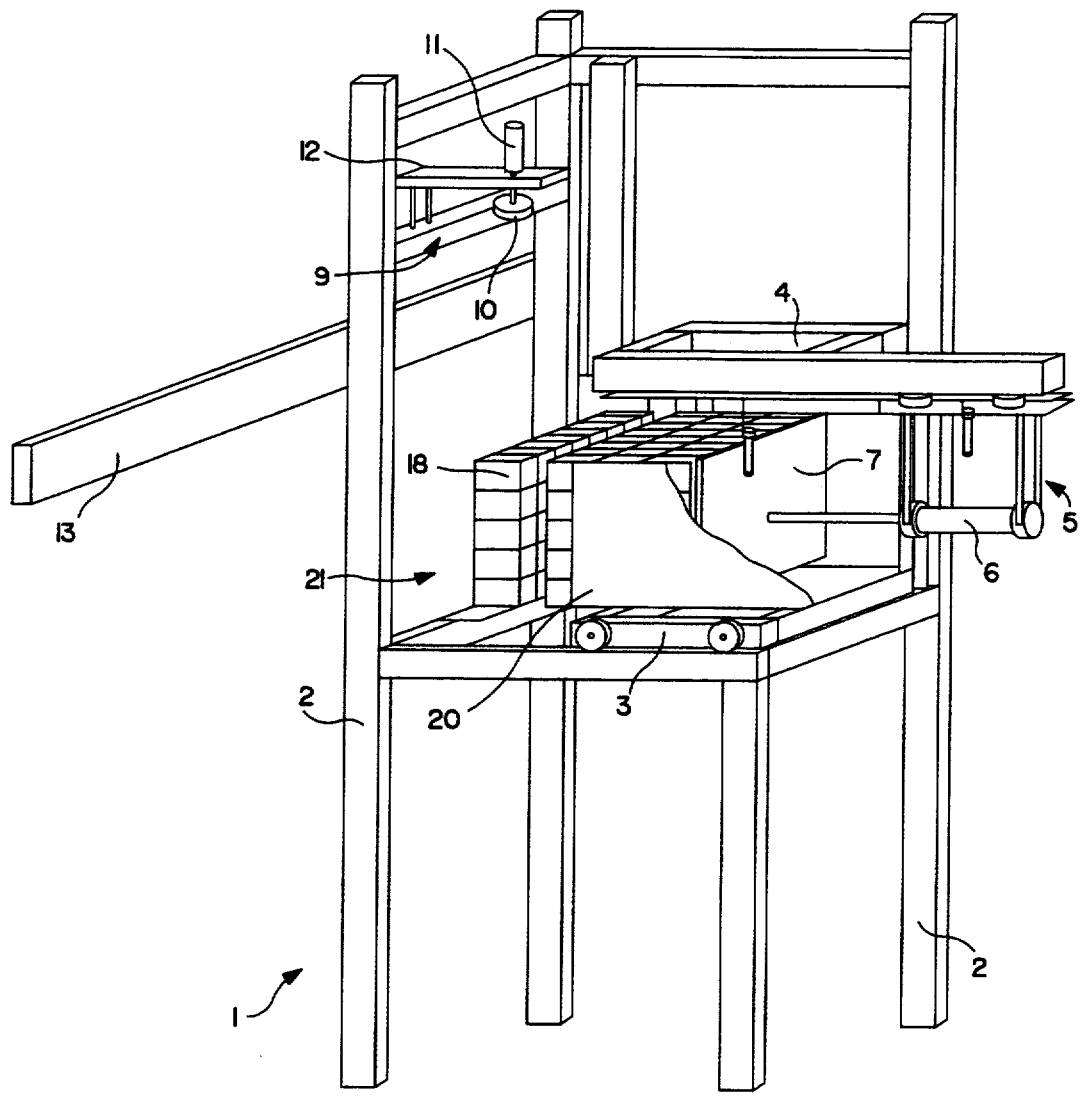
Figure 7:
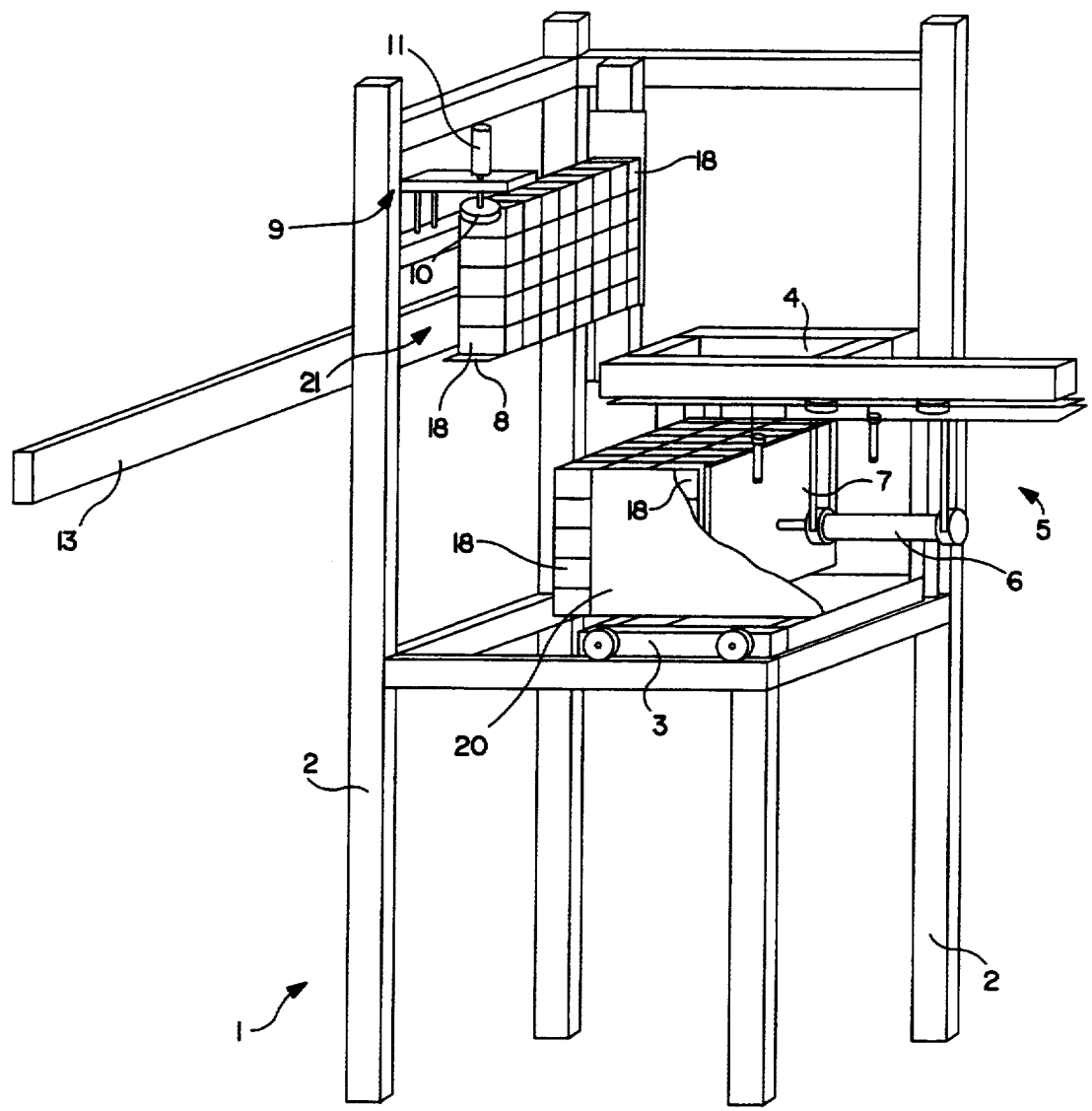
FIG. 7 is a perspective view, similar to FIG. 4, of the apparatus according to the present invention during the stage of positioning the column of musicassettes for the extraction of musicassettes one by one.
Figure 8:
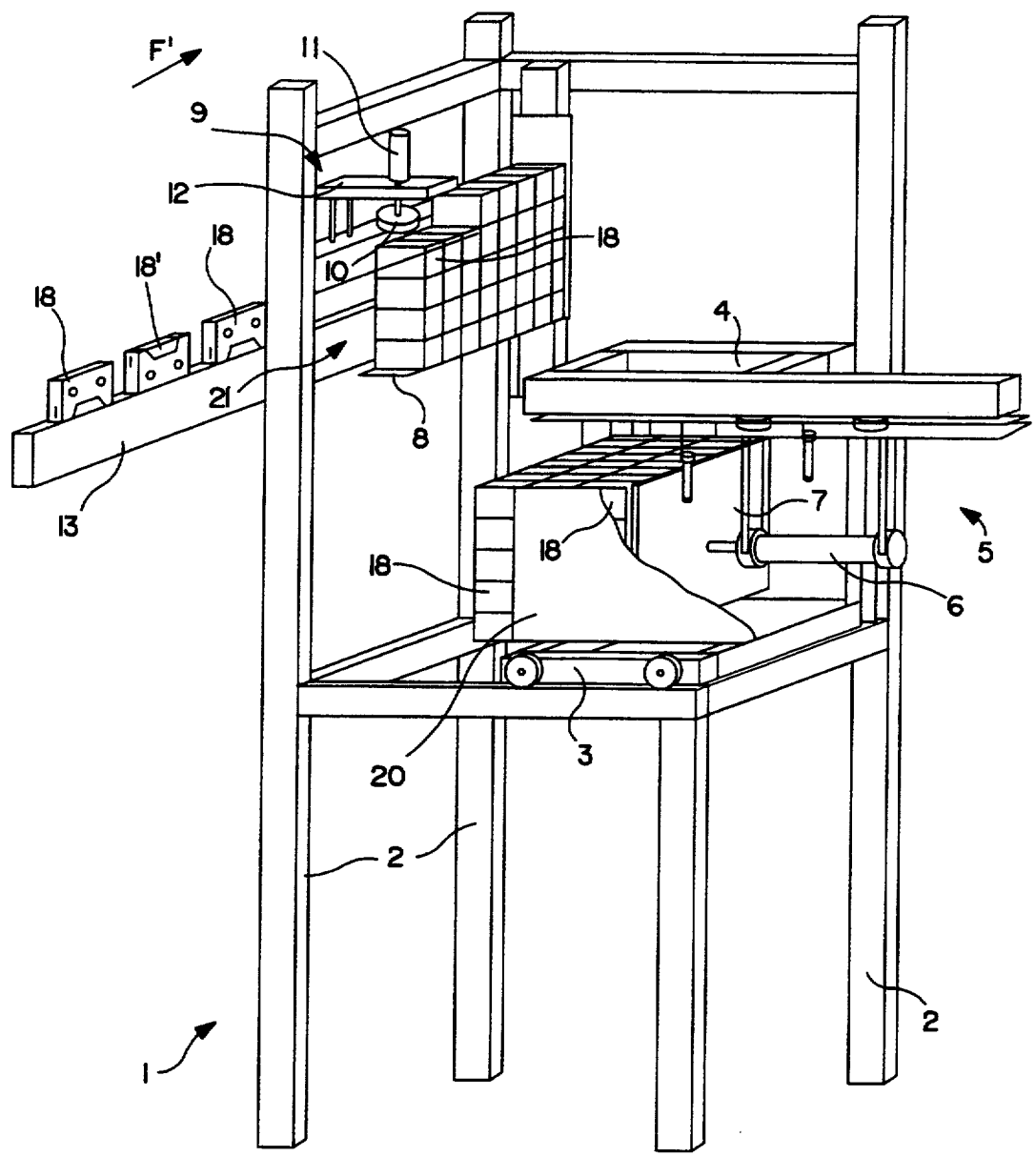
FIG. 8 is a perspective view, similar to FIG. 4, of the apparatus according to the present invention during the stage of extracting the musicassettes one by one for processing.
Figure 9:
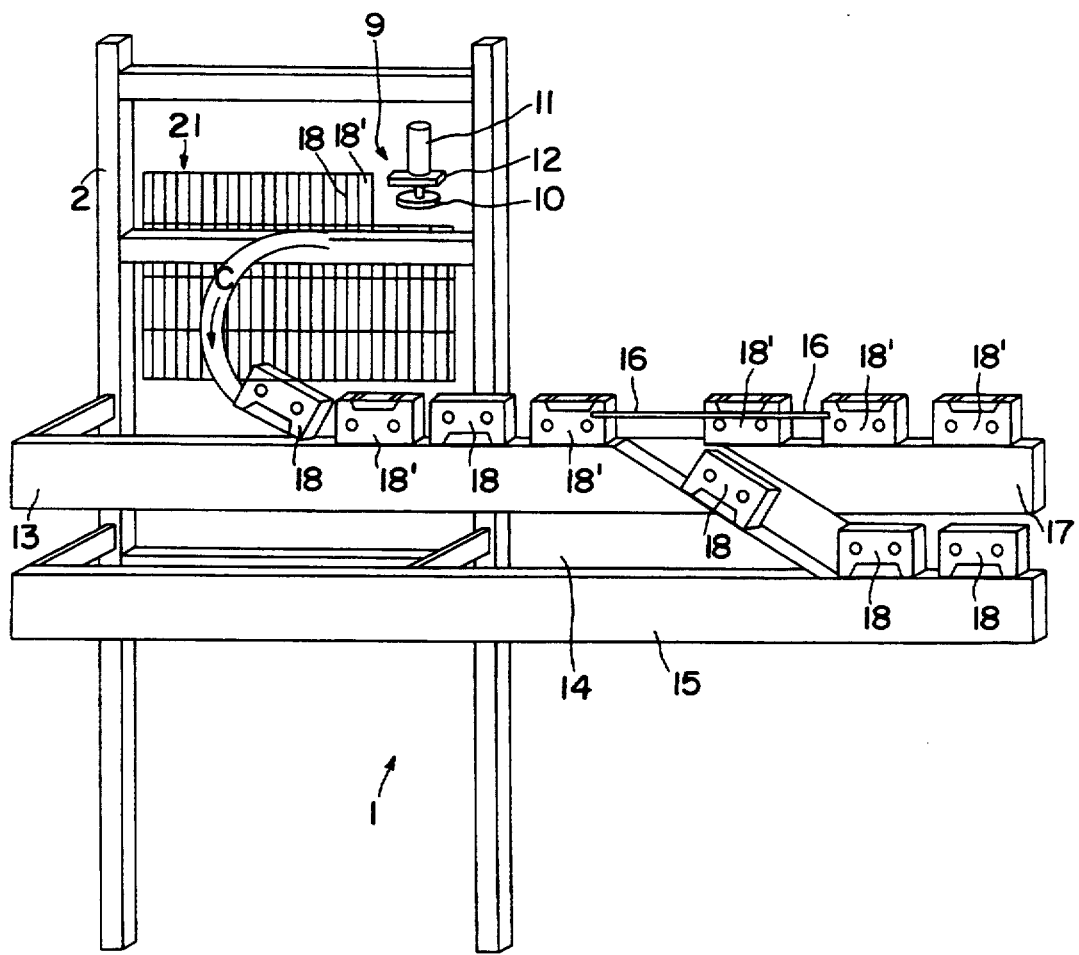
FIG. 9 illustrates the device for separating the musicassettes one by one for processing, on the basis of their orientation, used in the apparatus according to the present invention.
Figure 10:
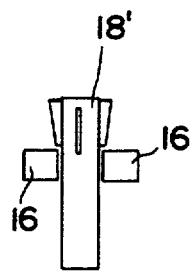
FIG. 10 is an enlarged fragmentary cross-sectional view on the line 10—10 of FIG. 9.

As can be seen in FIGS. 8, 9 and 10, the musicassettes 18, 18' will obviously enter the track 13 with the same alternating orientations they had in the row, one standing on its thicker side (18) and one on its thinner side (18'). However, the automatic tape-inserting or labelling machine cannot operate unless all the musicassettes are standing thinner side down. It is therefore necessary to separate the musicassettes 18 from the musicassettes 18' and then invert the former, so that when they reach the automatic machine they are all oriented like the musicassettes 18'. To bring this about, guides 16 (FIG. 9) are provided at the end of the track 13. As can be seen in the detail shown in FIG. 10, these are a pair of parallel guides 16 positioned above the track 13 at such a height as to admit the musicassettes 18' and to fit immediately beneath their portion of increased thickness. The guides 16 are separated from each other by a distance approximately equal to the lesser thickness of the musicassettes 18' (for example 9 mm). In this way, only the musicassettes 18' are caught between the guides 16, thereafter being deposited on the track 17 and continuing their journey in the same manner. The musicassettes 18, however, are not held when they enter the guides 16 and move on down the steeper track 14 to the track 15, whence they can be passed to some means of up-ending them before being fed back to join the musicassetes 18' and then continuing their journey to the automatic tape-inserting or labelling machine. When the wheel 10 has extracted all the musicassettes 18, 18' from the first row of the column 21, the extractor 9 is returned by the translation drive 12 to its starting position, the levator 8 lifts the column 21 higher to bring another row of cassettes into contact with the wheel 10, and the process of extraction is recommenced, being repeated until all the musicassettes 18, 18' of the column 21 have been extracted. At this point the elevator 8 is returned to its starting position, the magazine carriage 3 advances in the direction of arrow F (FIG. 5), the piston of the thrust cylinder 6 again pushes the plate 7 against the free face of the pack of musicassettes 18, 18', and a new stage is begun, unloading another column 21 of musicassettes 18, 18' on to the elevator 8. The sequence described above is recommenced and repeated until the whole pack of musicassettes 18, 18' contained inside the false box 20 has been unloaded by it and the musicassettes 18, 18' have all been fed onto the track 13. The false box 20 is then taken away by the magazine carriage 3 and replaced by another false box 20 containing another pack of musicassettes 18, 18'.

Modifications and variations of the above described loading apparatus are possible without departing from the scope of the present invention. In particular, it should be observed that the purpose and use of said apparatus are not limited to musicassettes, whether empty or complete with tape, but extend to any other kind of object or product packed in rows and columns, such as (to mention only a few examples) videocassettes, books, pharmaceutical products, records, cartridges and so on.

Moreover, although the apparatus has been designed to process objects packed in alternating orientations, it can clearly be used to advantageously process identically oriented objects. The operation of the apparatus could be automated, particularly as regards the moment when the false box on the magazine carriage is changed (in the embodiment described above, this is envisaged as being done manually), which would permit a further speeding up of the work.

I claim:

1. Apparatus for loading objects packed in rows and columns, in superimposed layers, into automatic machines for the purposes of subsequent processing where said objects must be presented one by one with the same orientation, said objects having a greatest thickness and a least thickness, the apparatus being characterized in that it comprises: a false box formed by freely associating two angle plates, which box can be inserted into packing boxes; a mobile magazine carriage for accommodating and holding said false box; a slide moving parallel to and located above the magazine carriage, thrust means mounted on the slide at one side of the magazine carriage, the thrust means moving in a same direction as the slide; on the opposite side of the magazine carriage an elevator whose base is equal to the base of one column of said objects; an extractor unit able to move translationally perpendicularly to the direction of movement of the magazine carriage, of the thrust means and of the slide; a track on which the extracted objects are removed from the extractor unit; a pair of parallel guides along said track, separated from each other by a distance corresponding to said least thickness of the extracted objects and running above said removing track; and two other removing tracks leading away from the first track, immediately downstream of said parallel guides, one track supporting objects having said greatest thickness uppermost and which are prevented by said guides from passing downward between said guides, and the other said removing track being disposed lower than said one track and receiving objects having said least thickness uppermost and which move downward between said guides onto said other track.

2. Apparatus according to claim 1, in which the angle plates forming said false box are made of a rigid material.

3. Apparatus according to claim 1, in which said thrust means comprise a piston in a cylinder and an end plate perpendicular thereto whose dimensions are less than or equal to those of an open face comprised between said angle plates of said false box.

4. Apparatus according to claim 1, in which said translationally moveable extractor unit comprises a high-speed rotating wheel and a translational drive for the unit.

5. Apparatus according to claim 4, in which at least the circumference of said rotating wheel is of a material having a high coefficient of friction.

6. Apparatus according to claim 5, in which said circumference of said wheel has a rubber coating.

7. Apparatus according to claim 1, in which said removing tracks are conveyor belts.

8. Apparatus according to claim 1, in which the objects to be loaded are musicassettes.

9. Method for loading automatic machines with packed objects for subsequent processing where said objects must be presented one by one with the same orientation, the method being characterized in that it comprises the following stages: extracting the packed objects from a box without altering their orientation as packed; loading the objects on to a magazine frame; extracting one column at a time of said objects and causing said one column to approach object extraction means; extracting the objects one by one from said column; and removing said objects from said frame.

10. Method according to claim 9, comprising also the step of separating said objects into two groups according to their orientation.

* * * * *